May 31, 1938.  V. L. ANDREW  2,119,033
STUFFING BOX
Filed Feb. 24, 1937

INVENTOR.
Vaughan L. Andrew.
BY
Geo Stevens.
ATTORNEY.

Patented May 31, 1938

2,119,033

UNITED STATES PATENT OFFICE 2,119,033

STUFFING BOX

Vaughan L. Andrew, Superior, Wis.

Application February 24, 1937, Serial No. 127,433

3 Claims. (Cl. 286—32)

This invention relates to stuffing boxes, and particularly to those adapted for use on reciprocating rods, such as piston rods, pump plungers, or the like.

The principal object of the invention is to provide practical means for maintaining uniform pressure upon the adjustable gland in such devices and which surround the member to be provided with the tight joint.

A practice, old in the art, for accomplishing such resilient action of the stuffing gland is to surround the piston rod or member being packed with an expansive spring controlled by a nut supported independently of the gland, which, however, is known to frequently cause trouble in scoring the rod or otherwise lessening the efficiency of the packing gland, and to avoid which is another object of the invention.

Still other objects and advantages of the invention will appear in the following description thereof, and more particularly pointed out in the appended claims.

Referring now to the accompanying drawing, forming part of this application, and wherein like reference characters indicate like parts:

Figure 1:
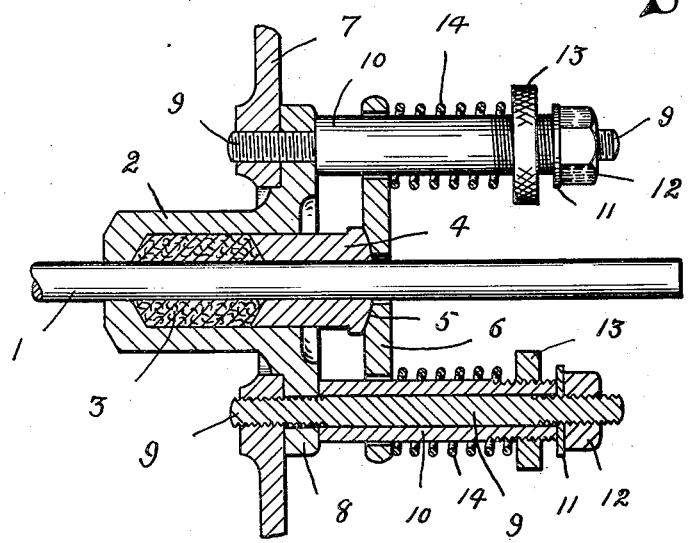
Figure 1 is a part section and part elevation of one embodiment of the invention as applied to a reciprocable rod packing.

In Figure 1, I represents the reciprocable rod, for example that of a pump or the like, and 2 the stuffing box surrounding same provided with the usual chamber into which the packing 3 is applied and held there by the ordinary gland 4. However, in this instance, this gland is provided with a segmentally spherical outer terminus as indicated at 5 which is designed to universally cooperate with a similarly shaped concavity in the pressure bar or member 6 forming the principal feature of the instant invention.

7 represents the outer wall of a pump or engine block through which the rod I is caused to reciprocate and in which wall the packing joint is installed. It will be noted that in this illustration the stuffing box is provided with a flange-like outer terminus indicated at 8, which overlaps the outer edges of the opening through the wall in which the packing joint is installed, though this construction may vary without in any way affecting the function of the invention. I have here shown the connection of the stuffing box to the wall 7 as being accomplished by the stud or tap bolts 9 extending at their inner ends through same, while their outermost portions extend to some considerable distance parallel with the rod I, and on opposite sides thereof. Upon these bolts are slidably applied, as telescopically thereover, the sleeves 10 which are each held in position by a suitable washer and nut 11 and 12 respectively, the nuts being screw threaded upon the outer extremities of these bolts, and by which a tight union of the flange 8 of the stuffing box with the wall 7 is accomplished as well as a secure positioning and holding of the sleeves 10. About the sleeves 10 is installed the opposite ends of the cross or pressure bar 6, each end having a sufficiently large and free hole therein for such installation, it being understood that these holes are amply large to permit of considerable angularity of the cross bar without interfering in any way with the rod I or the bar's action upon the gland, it being seen that such freedom of hole surrounding the rod centrally of the bar is similarly provided.

The outer surface adjacent the outer ends of these sleeves is screw threaded and carries knurled adjusting nuts 13 thereupon. Between each of these nuts and the corresponding end of the cross bar 6 is installed suitable expansive helical springs 14 so that the pressure inwardly against the end of the cross bar may be selectively and most conveniently governed by the adjustment of the thumb nuts 13 on the sleeves 10. Having opposed adjusting means on opposite ends of the bar in this manner with the latter being provided with the semi ball and socket joint for universal or free oscillatory contact with the outer end of the gland, it is quite immaterial as to the relative amount of adjustment applied to each end of the bar. In other words such a connection provides a most convenient manner of accomplishing a nice adjustment of the gland when any possible leakage might occur without the operator being especially careful in making such adjustment, and which is well known to be very advantageous in devices of this kind.

Figure 2:
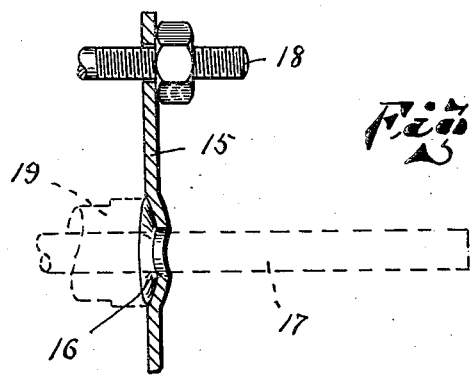
Figure 2 is a similar view of a fragmental portion of a modified application of the invention.

Now to simplify the construction of such a device, attention is directed to the illustration in Figure 2 of a similarly efficient device wherein the cross bar 15 may be of light stamped material having the same circular concavo-convex central portion 16 with a relatively large hole through the center thereof for accommodating the reciprocal rod, and which cross member may have sufficient inherent resilience in its opposite extremities to insure continued pressure against the gland after adjustment of the ends thereof which surround the holding studs or bolts 18 each carrying a nut externally thereof for direct contact with the outer face of such extremities and by which means the desired constant pressure against the stuffing gland 19 may be accomplished.

It will be obvious, too, that the invention is applicable to and will function equally as well when associated with a rotary rod instead of a reciprocating one.

Having thus described my invention, what I claim and desire to secure by Letters Patent, is:

1. Means for exerting a constant pressure upon the gland of a stuffing box about a reciprocable piston rod, comprising a plurality of bolts spaced about said rod, a sleeve about each bolt, a pressure bar having holes therethrough for loosely fitting upon said rod and sleeves, a helical spring about each sleeve and bearing against said pressure bar, and means upon each sleeve for adjusting the pressure of the springs against the pressure bar.

2. Means for exerting a constant pressure upon the gland of a stuffing box about a reciprocable piston rod, comprising a pair of bolts upon opposite sides of and parallel with said rod, a sleeve upon each bolt, a nut on each bolt for holding each sleeve firmly in position, a spring upon each sleeve, a pressure bar having holes therethrough for loosely fitting upon the sleeves and bolt and bearing against the gland, said springs pressing upon the ends of said bar, and means for adjusting the tension of the springs.

3. Means for exerting a constant pressure upon the gland of a stuffing box, the gland of said box having a segmentally spherical head, a pair of bolts one upon either side of said box, a resilient pressure bar having holes in the ends thereof for loose fitting about said bolts and a central concaved portion for engaging the head of the gland, and means upon said bolts for exerting a constant pressure against the ends of the bar whereby the resilience of said bar exerts corresponding pressure against said head and regardless of the relation of the pressure bar to said head.

VAUGHAN L. ANDREW.